Figure 1:
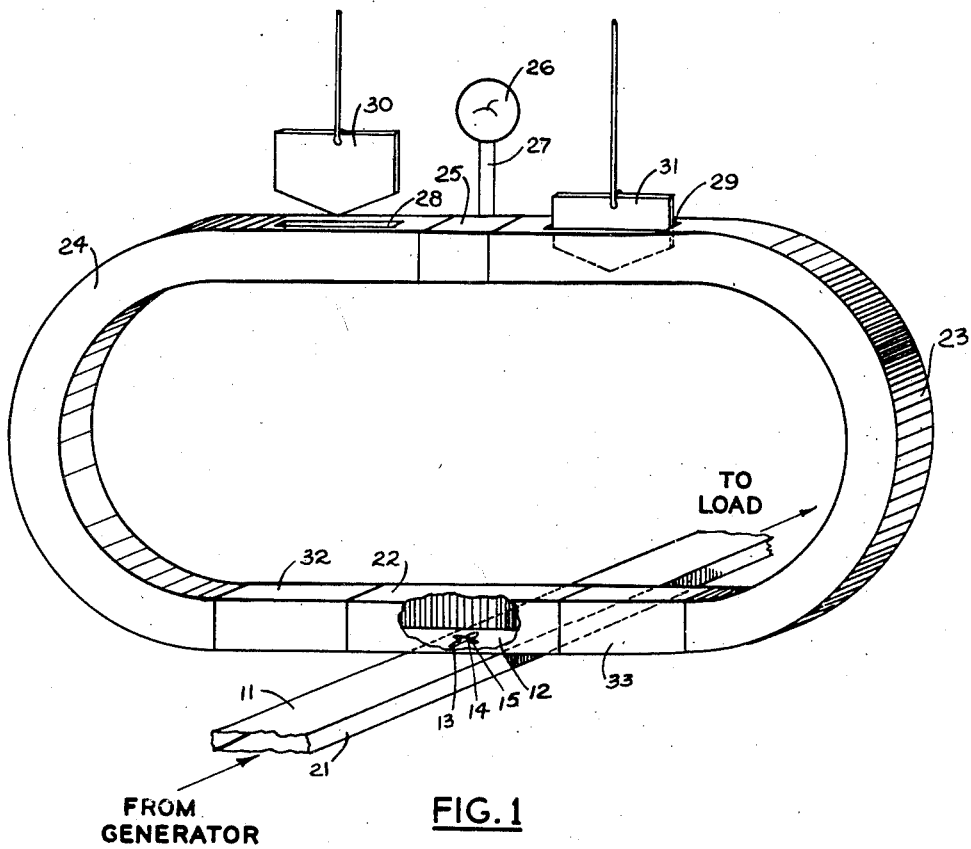

Aug. 23, 1949.   J. W. TILEY   2,479,650
SELECTIVE WAVE GUIDE ENERGY METER
Filed Nov. 1, 1944

INVENTOR.
JOHN W. TILEY
BY
ATTORNEY

UNITED STATES PATENT OFFICE 2,479,650

SELECTIVE WAVE GUIDE ENERGY METER

John W. Tiley, Philadelphia, Pa., assignor to Philco Corporation, Philadelphia, Pa., a corporation of Pennsylvania Application November 1, 1944, Serial No. 561,334

12 Claims. (Cl. 171—95)

My invention relates to a novel device for the independent measurement of the electrical components of a micro-wave signal, and more particularly to a novel measuring system for independently measuring incident and reflected waves.

Wave guides are commonly used in micro-wave systems as a means for transmitting the micro-wave energy from a micro-wave generator to a load, that is, the device which utilizes the micro-wave energy. Often such a load comprises some form of an antenna or radiator of radio frequency energy.

Unless the load is perfectly matched to the wave guide, i. e., has an impedance which is equal to the characteristic impedance of the wave guide, the energy flowing from the generator to the load is not all absorbed by the load. When these impedances are different, mismatch occurs, and some of the energy which arrives at the load is reflected back into the wave guide towards the generator. The net result is a flow of energy within the wave guide travelling in each of two directions, one from the generator to the load and the other from the load to the generator. The first of these is called the incident wave and the other is called the reflected wave.

The presence of a reflected wave indicates mismatch of the load to the wave guide. In the study of wave guides, it is desirable to know the degree of mismatch because this will provide information concerning the efficiency of operation of a wave guide and load. If the reflected wave is small, the efficiency of transmission will be high, whereas if the reflected wave is nearly equal to the incident wave, the efficiency of transmission will be low.

When both incident and reflected waves are present in a wave guide, it is found that at certain points in the guide they reinforce each other, whereas at other points in the guide they tend to counteract each other. Thus there is a variation in total field strength from place to place along the wave guide, and this variation is periodic. As a result there exist standing electromagnetic waves in the wave guide.

The ratio of the field strength of the reflected wave to the field strength of the incident wave is called the reflection factor. This factor is zero if the load is perfectly matched to the guide because there is no reflected wave. The factor is unity when all of the incident wave is reflected and cannot go higher than this. When the reflection factor is low, there is very little standing wave present, but when the reflection factor is high, there is a strong standing wave present. In fact, if the reflection factor is unity the standing waves are very large since at the point where the incident and reflected waves counteract each other there is perfect cancellation since the two waves are of equal magnitude.

The measure of a standing wave is termed the standing wave ratio. It is the ratio of the total field strength in the wave guide at the place where the total field strength is a maximum to the total field strength at the place where the total field strength is a minimum. Thus, the standing wave ratio often designated as SWR, is the maximum field strength divided by the minimum field strength.

In order to measure this standing wave ratio, it has heretofore been the practice to cut a slot in the middle of the broad side of a wave guide. One end of a small probe is inserted in this opening and the other end is connected to a suitable measuring device, such as a crystal rectifier microammeter combination. As the probe is moved along the slot, the microammeter reading will vary up and down in accordance with the standing waves in the wave guide. The measure of the standing wave in the wave guide is then the ratio of the field strength at the position of maximum microammeter reading to the field strength at the point of minimum reading.

When the standing wave ratio has been determined by an instrument such as the standing wave meter or slotted section described above, the reflection factor can be determined by the equation: Reflection factor=(SWR−1)/(SWR+1).

Such slotted sections are standard measuring equipment for microwave testing. They have, however, the great disadvantage that the probe must be run back and forth along the slot to determine the maximum and minimum readings. It would be much more convenient if in some way the incident and reflected waves could be separated from each other and measured independently.

In accordance with my invention, I provide a novel wave selector arrangement which enables independent measurements of both the incident and reflected waves by the same crystal detector and meter, or by the same bolometer or thermistor and associated bridge system.

Accordingly an object of my invention is to provide a novel wave selector arrangement to provide a wave selector in which independent readings of the incident and reflected waves are made and in which such readings are made on a single measuring device.

There are other objects of my invention which together with the foregoing will appear in the detailed description which follows in connection with the drawing in which Figure 1 is a perspective view of one form of my novel wave selector.

Figure 2:
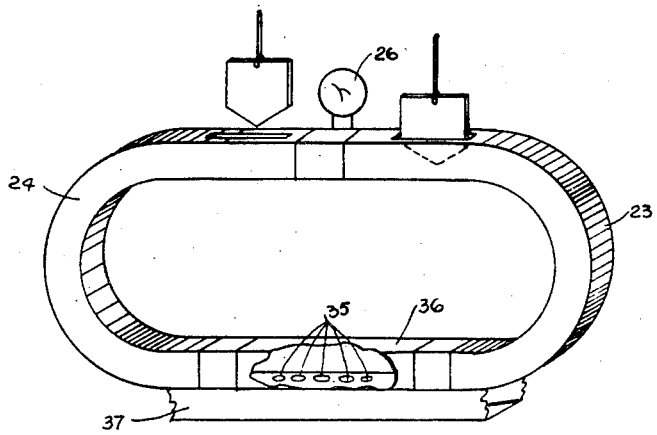

Figure 2 shows a modified form of wave selector which may be used in carrying out my invention.

In Figure 1 the main wave guide 21 of rectangular cross-section conducts a micro-wave signal in the rectangular wave guide $TE_{01}$ mode from a generator at the left (not shown) to a load at the right (not shown).

Due to mismatch, some of this energy is reflected back from the load travelling toward the left to the generator.

In accordance with my invention I independently measure the energy travelling to the load and the reflected energy travelling from the load.

To this end, I couple the main wave guide 21 to a secondary wave guide 22 in such a manner that energy flowing in one direction in the main wave guide will induce energy flowing in one direction in the secondary wave guide. Energy flowing in the opposite direction in the main wave guide will induce energy flowing in a corresponding direction opposite to that induced by the first described energy flow.

This is effected by mounting the secondary wave guide, perpendicular to main wave guide 21 at their area of engagement, and by the construction described in detail below.

The wave guides 21 and 22 are of substantially similar construction and are positioned so that the upper wall 11 of the wave guide 21 contacts the lower wall 12 of the wave guide 22 over a substantially square area.

If wave guide 21 is energized at one end thereof by a source, a uni-directional traveling wave will be propagated down the guide to whatever termination is provided at the other end thereof. In general, electromagnetic energy propagating down the wave guide 21 will result in current flow on the inner walls of the wave guide. The exact nature of the current flow on the inner surface of the guide is, of course, determined by the type of wave propagated therein. For example, most TE waves in rectangular wave guide will have both current flow parallel to the axis of the wave guide and perpendicular to the axis of the wave guide.

The longitudinal and transverse currents flowing on the inner surface of a wave guide carrying a uni-directional traveling wave are always 90° out of phase. There exists spaced points within the wave guide 21 where the longitudinal and transverse currents in the metallic surface are equal in magnitude and 90° out of phase. As illustrated in Figure 1, a pair of mutually perpendicular slits 13 and 14 have been cut into the upper surface 11 of the wave guide 21 having an intersection at point 15 along a diagonal of the square formed by the contacting walls of the two guides. These slits 13 and 14 which perpendicularly bisect each other at point 15 are arranged so that slits 13 intercept the transverse current in the wave guide 21, and slits 14 intercept the longitudinal current normally flowing on the inner surface of the upper wall 11.

If now point 15 is located so that the longitudinal and transverse current thereat are equal in magnitude, then the current flow at the edges of slits 13 and 14 will be equal in magnitude but ninety degrees out of phase. Accordingly, during one quarter of the wave, the transverse current will be decreasing while the longitudinal current will be increasing in the reverse direction. As is well understood, this type of current flow will result in an electro-magnetic field pattern of circular polarization.

The sense of rotation of the electro-magnetic field thus produced is of course dependent upon the direction of the longitudinal and transverse current flow at the edges of slits 13 and 14 respectively. This is in turn dependent upon the direction of energy flow within the wave guide 21, and accordingly the sense of the circularly polarized electro-magnetic field established at slits 13 and 14 will be a function of the direction of energy flow within wave guide 21.

The circularly polarized magnetic field established at the slits 13 and 14 will, if the slits are small as compared with a wave length, be radiated from wave guide 21.

As illustrated in Figure 1, wave guide 22, which intersects similar wave guide 21 at right angles, contains a symmetrically located pair of mutually perpendicular slits 13 and 14, which coincide with the corresponding slits in the upper wall 11 of the wave guide 21. In other words, the pair of slits 13 and 14 are cut into the common contacting surface between the wave guides 21 and 22. These slits in the two wave guides are of equal length where, as here, the two guides have their axes at right angles.

In accordance with my invention, the electromagnetic field of circular polarization established at the slits 13 and 14 as a result of current flow on the inner surface of wave guide 21 is radiated into the wave guide 22. Further, the radiation of waves of circular polarization through crossed slits of the type described will establish within the wave guide 22 a uni-directional traveling wave, the direction of which is a function of the rotational sense of the common electromagnetic energy. The traveling waves thus established in wave guide 22 will be propagated in a single direction to any suitable termination provided therefor. Thus by loading wave guide 22 with the correct terminating impedances at both ends, a single uni-directional wave in the first guide will excite a uni-directional wave in the second guide.

Secondary wave guide 22 is bent at 23 and 24 and brought together onto the two sides of the terminal 25. This terminal contains a crystal detector or a bolometer or other method for indicating micro-wave power and is connected to an indicating meter 26 by conductors 27. On each side of the terminal, there are two slots 28 and 29 in the broad face of the wave guide near the center. Above slot 28 there is shown a strip of resistive material 30, operable by any suitable means into and out of slot 28. In the position shown, resistive material 30 is shown out of the slot. A similar type of resistive strip 31 similarly operable into and out of slot 29 is shown inserted in slot 29.

As the system is shown arranged, some of the incident wave travelling in the main guide 21 from the generator to the load will leak through the slot 13—14. This energy which leaks through will be so polarized, as described above, that it will travel in the secondary guide 22 towards the bend 23, and will reach the resistive slot material 31. This material is so designed in accordance with standard micro-wave principles that it will absorb all the energy which flows around the bend 23, and none will pass beyond it so that no energy coming from bend 23 will reach the terminal 25.

Thus, there will be no indication on the meter 26 as a result of an incident wave travelling in the main wave guide 21. However, some of the reflected wave in the main wave guide 21 travelling from the load to the generator will leak through the slits 13 and 14. This energy induced in the secondary wave guide will travel towards bend 24 in accordance with the properties of the slots 13 and 14. The energy which passes bend 24 is not intercepted by resistive strip 30 since this resistive strip is withdrawn from the slot 28 as shown. This energy, therefore, reaches the energy absorbing terminal 25 and gives an indication on the meter 26. If energy is reflected back through 24, it becomes a part of the energy dissipated by resistive strip 29 from the direction of bend 23. However, if any energy passes through the terminal and reaches the resistive strip 29, it will be absorbed by this resistive strip and will not reach bend 23. In other words, it will not make more than half a circular trip from the slits 13 and 14 through bend 24 to the terminal 25 and possibly through to part of the resistive strip 29.

As a result of this operation, the meter 26 will provide an indication in accordance with the amount of reflected signals travelling in the main wave guide 21. The incident signal will have no effect upon the reading of meter 26.

If now the resistive strip 31 should be withdrawn from the wave guide, and the resistive strip 30 should be lowered into the wave guide through slot 28, the operations described above will be exactly reversed. The incident wave in main wave guide 21 will induce through slits 13 and 14 a wave travelling in guide 22 towards bend 23 and towards the slot 29. Now, however, the resistive strip is not in the wave guide and so this wave reaches the terminal 25, and causes a deflection on meter 26 in accordance with the energy value induced by the incident wave.

The reflected wave in the main wave guide 21 induces a wave in the secondary wave guide 22 through slits 13 and 14 which will travel toward the bend 24. This wave however will be intercepted by the resistive strip 30 which is now lowered into the wave guide through slot 28, and so this reflected wave will not travel beyond the resistive strip 30.

If any of the waves in the secondary wave guide which came by way of bend 23 should pass beyond the terminal 25 it will be intercepted by the resistive strip 30.

If energy is reflected back through bend 23, it becomes a part of the energy dissipated by resistive strip 30 from the direction of bend 24.

The net result of this operation is that meter 26 reads in accordance with the strength of the incident wave in wave guide 21 travelling from the generator to the load so that all that is necessary is to make one measurement with resistive strip 30 withdrawn and with resistive strip 31 inserted into the wave guide. Then it is necessary to make one other measurement with resistive strip 31 withdrawn and with resistive strip 30 inserted. Inasmuch as these two measurements then give readings on a single meter which can be converted to give the strength of the incident and reflected waves in the main wave guide, only one meter calibration curve is required.

This arrangement avoids the necessity for having two calibration curves for two different terminals and associated meters and makes it possible to make measurements which are free from the error of two individually different detectors. Here the same detector is used for the measurements of both the incident and the reflected waves.

In the construction of this device, it is of course necessary that the bends 23 and 24 be sufficiently gradual so that there is no reflection occurring from these bends. These can be made in accordance with well known principles of micro-wave engineering which specifies the radius of curvature in proportion to the wave length of the signal being used in the wave guide.

In all of these wave guide systems, the type of wave which is being transmitted is the $TE_{01}$ mode. That is, the electric lines are perpendicular to the broad face of the wave guide and the magnetic lines are parallel to the broad faces of the wave guide. The electric lines are always straight lines and the magnetic lines are closed curves or swirled or "smoke ringed," as one wishes to describe them. The junction between the two guides is always on the broad face of the guide.

Although for purposes of illustration I have shown a pair of intersecting slots for exciting a uni-directional wave in the secondary wave guide, as described and claimed in the co-pending application of William E. Bradley, Serial No. 549,617, filed August 15, 1944, now Patent Number 2,473,274, issued June 14, 1949, it will be understood that any construction for coupling a main and secondary wave guide so that a wave travelling in a predetermined direction in the main wave guide, which will induce a predetermined unidirectional wave in the secondary wave guide, will come within the scope of my invention. Thus I may use holes a quarter wave length apart as described in the application of Sunstein et al., Serial No. 561,242, filed October 31, 1944, for inducing such waves. When a single hole is used, it is necessary that it be located on the diagonal of the square formed by the engaging surfaces of the two wave guides and at least half way from the center.

A system using Sunstein's method of coupling is illustrated in Figure 2 in which the main wave guide 37 is coupled to the secondary wave guide 36 through the holes 35. As described in the Sunstein et al. application, referred to hereinbefore, by positioning a series of holes as at 35 a quarter wave length apart, a unidirectional wave is induced in the secondary wave guide 36, the direction of travel of the induced wave being determined by the direction of travel of the wave in the main guide. As described in the aforementioned application, the use of five or more holes widens the band of frequency that can be efficiently coupled, the amplitude of the signal transmitted by the elements being related to each other by the co-efficient of the binomial expansion of $(a+b)^n$.

The unidirectional signal induced in guide 36 will now flow either around bend 23 or 24 and to the measuring device 26, as fully explained in connection with Figure 1.

Thus, any coupling between the main and secondary wave guides, which will induce a unidirectional signal, may be used.

With the system as shown in Figure 1, the readings on the meter 26 may be very different in value, particularly if the ratio of the reflected to the incident wave, that is, the reflection coefficient of the load, is very small. In order to prevent difficulties in reading two widely different values on the meter 26, there may be inserted two attenuators in the secondary wave guide at positions 32 and 33. When these attenuators are in place, the operation will be as follows: an incident wave in the main wave guide 21 will induce into wave guide 22 a small energy wave travelling towards bend 23. This wave must pass through attenuator 33. This attenuator can be adjusted until the reading on meter 26 is a specific value. This of course must be done with resistance card 30 inserted into the wave guide and with resistance card 31 withdrawn from the wave guide.

Then the reading on the meter 26 is less than it would be without the insertion of attenuator 33. Consequently, the actual value of the travelling incident wave in the main wave guide 21 will be determined by multiplying the reading of meter 26 by the factor indicated by the attenuator 33. A reflected wave in the main wave guide travelling from the load to the generator will induce into guide 22 a wave travelling toward bend 24. This must travel through attenuator 32, and in this circumstance if the strip 31 is lowered into the guide and the strip 30 is raised from the guide, the motor will then read the actual strength of the wave travelling from the load to the generator divided by the factor of the attenuator 32.

Summarizing in actual operation, my system is operated as follows: first, the resistance strip 31 is inserted and resistance strip 30 removed. Then attenuator 33 is adjusted until a specific reading is obtained on the meter 26. Then the positions of the strips 31 and 30 are reversed inserting strip 31 and removing strip 30. The meter is adjusted to the same value obtained before by adjusting attenuator 32. The relative strength of the incident and reflected waves is then given by the relative setting on the two attenuators 33 and 32.

Thus, assuming that in measuring the reflected wave, the attenuator 32 is set for a reduction in signal level by a factor of 2 and assuming that for the same meter reading of the incident wave, attenuator 33 is set so that it will reduce the signal by a factor of 6. The reflection co-efficient is ⅓. Such a method of operation removes the necessity of having a calibrated crystal.

This is one satisfactory method of utilizing my system, although the direct method using the calibration of meter 26 is also satisfactory so long as the difference between two readings on this meter is not too large.

This method of using a pair of calibrated attenuators will make it possible to measure standing wave ratios which are quite small. That is, measurements of relatively small reflected waves in the presence of a large incident wave in the main wave guide can be made. My structure thus makes the technique of measurement of standing wave ratios or of reflecting factors very simple with wave guide systems. It also makes impedance measurement, measurements of standing wave ratios, and measurements of reflection factor on micro-wave equipment simple.

While I have described my invention as applied to wave guides, it will now be apparent that the same principle may be applied to other microwave transmission systems, and I do not wish to be limited by the specific illustrations herein given but only by the appended claims.

I claim:

1. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal mounted in a section of said closed wave guide loop and matching said wave guide from said coupling section to said terminal.

2. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal including a measuring device mounted in a section of said closed wave guide loop and matching said wave guide from said coupling section to said terminal.

3. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal including a measuring device mounted in a section of said closed wave guide loop and matching said wave guide from said coupling section to said terminal, and a terminating device for absorbing substantially all wave energy flowing in the opposite direction in said closed wave guide loop.

4. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal including a measuring device mounted in a section of said closed wave guide loop and matching said wave guide from said coupling section to said terminal, and a pair of terminating devices for absorbing wave energy flow thereto selectively insertable in said wave guide on opposite sides of said measuring device.

5. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal including a measuring device mounted in a section of said closed wave guide loop symmetrically disposed with respect to said coupling section, and matching said wave guide from said coupling section to said terminal.

6. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal including a measuring device mounted in a section of said closed wave guide loop symmetrically disposed with respect to said coupling section, and matching said wave guide from said coupling section to said terminal, and a pair of terminating devices for absorbing wave energy flow thereto selectively insertable in said wave guide on opposite sides of said measuring device.

7. In an electrical measuring device comprising a closed wave guide loop, means for coupling a section thereof to a transmission line whose wave energy flow is to be measured, said coupling being so constructed that energy flowing in each direction in said line induces corresponding wave energy flow in a single direction in said closed wave guide loop and a terminal including a measuring device mounted in a section of said closed wave guide loop symmetrically disposed with respect to said coupling section, and matching said wave guide from said coupling section to said terminal, and a pair of terminating devices for absorbing wave energy flow thereto selectively insertable in said system on opposite sides of said measuring device, and a pair of attenuators selectively insertable in said wave guide on opposite sides of said coupling section.

8. In a reflection factor measuring system, a closed loop wave guide, a measuring device mounted in said wave guide, means for coupling said wave guide to a wave guide where reflection factor is to be measured, means comprising a resistive material for selectively absorbing energy induced by the incident wave flowing in one direction in said wave guide whose reflection factor is to be measured, while the reflected energy flowing in the other direction in said wave guide energizes said measuring device, and for absorbing energy induced by the reflected wave flowing in the opposite from said one direction in said wave guide while the incident wave energy flowing in said one direction energizes said measuring device.

9. In a reflection factor measuring system, a closed loop wave guide, a measuring device mounted in said wave guide, means for coupling said wave guide to a wave guide where reflection factor is to be measured, said measuring device and coupling means being symmetrically disposed with respect to each other in said wave guide, and said coupling means being so constructed as to propagate energy induced by the incident wave in said wave guide in a predetermined direction in said loop and to propagate energy induced by the reflected wave in said wave guide in the opposite direction in said loop, resistive means selectively insertable in said wave guide to selectively permit energy flow in one direction in said wave guide and to block energy flow in the opposite direction in said wave guide whereby said measuring device is operated only by wave energy induced by the incident wave flowing in said wave guide, and whereby said measuring device is operated only by wave energy induced by the reflected wave flowing in said wave guide.

10. In a reflection factor measuring system, a closed loop wave guide, a measuring device mounted in said wave guide, means for coupling said wave guide to a wave guide where reflection factor is to be measured, said measuring device and coupling means being symmetrically disposed with respect to each other in said wave guide, means for selectively preventing wave energy flowing in one direction in said wave guide whose reflection factor is to be measured from energizing said measuring device, while energy flowing in the other direction in said wave guide whose reflection factor is to be measured energizes said measuring device for preventing the wave flowing in said system, induced by the reflected wave in said line, from effecting said measuring device while it is being operated by the wave induced by the incident wave and for preventing the wave flowing in said system, induced by the incident wave in said line, from effecting said measuring device while it is being operated by the wave induced by the reflected wave.

11. Means for measuring the relative intensities of waves travelling in the two opposite directions in a wave guide, which wave guide includes means providing a wave direction selective aperture system in its conducting wall, comprising a pair of auxiliary wave guides constructed for association with said aperture system so that energy travelling in one direction in said first guide will be directed into only one of said auxiliary guides, and energy travelling in the other direction in said first guide will be directed only into the other of said auxiliary guides; means for selectively absorbing substantially all of the energy travelling in one or the other of said auxiliary guides; and a measuring device, associated in common with both of said auxiliary guides, for measuring the energy travelling therein.

12. Means for measuring the relative intensities of waves travelling in the two opposite directions in a wave guide, which wave guide includes means providing a wave direction selective coupling element, comprising a pair of auxiliary wave guides including means adapted to be associated with said coupling element so that energy travelling in one direction in said first guide will be directed into only one of said auxiliary guides, and energy travelling in the other direction in said first guide will be directed only into the other of said auxiliary guides; means for selectively absorbing substantially all of the energy travelling in one or the other of said auxiliary guides; and a measuring device, associated in common with both of said auxiliary guides, for measuring the energy travelling therein.

JOHN W. TILEY.

REFERENCES CITED

The following references are of record in the file of this patent:

UNITED STATES PATENTS

| Number | Name | Date |
| --- | --- | --- |
| 1,999,250 | Mollath | Apr. 30, 1935 |
| 2,205,873 | Buschbeck | June 25, 1940 |
| 2,302,143 | Pickles | Nov. 17, 1942 |
| 2,314,764 | Brown | Mar. 23, 1943 |
| 2,403,289 | Korman | July 2, 1946 |
| 2,408,033 | Beck | Sept. 24, 1946 |
| 2,416,790 | Barrow | Mar. 4, 1947 |
| 2,423,390 | Korman | July 1, 1947 |
| 2,423,416 | Sontheimer et al. | July 1, 1947 |
| 2,423,526 | Sontheimer et al. | July 8, 1947 |

OTHER REFERENCES

Publication "Electrosvyas," April 1941, pages 9–15; an R. T. P. translation, No. 1525; 9 pages, issued by the Ministry of Aircraft Production, of this article is found in Division 69.